Oct. 8, 1963  W. L. FULTON  3,106,351
ROTARY WINDING MACHINE
Filed Nov. 3, 1959  5 Sheets-Sheet 1
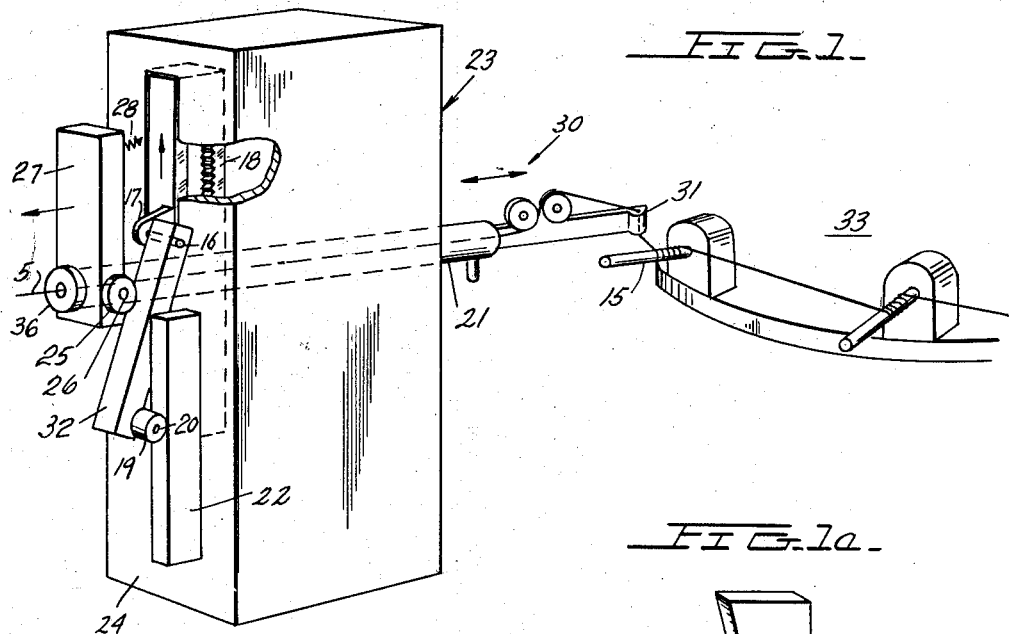
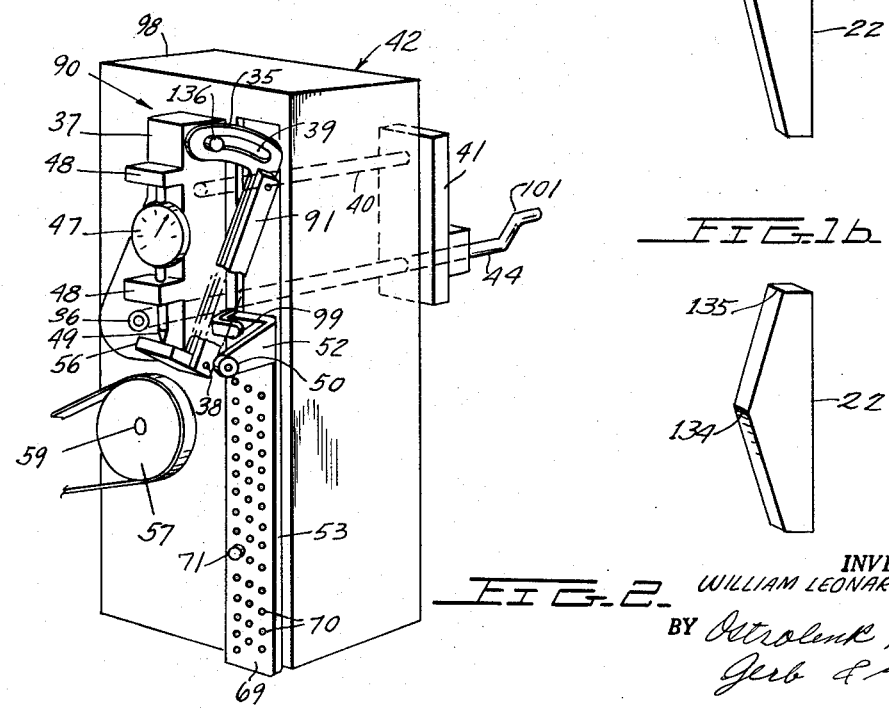
INVENTOR.
WILLIAM LEONARD FULTON
BY Ostrolenk, Faber,
Gerb & Soffen
ATTORNEYS Oct. 8, 1963  W. L. FULTON  3,106,351
ROTARY WINDING MACHINE
Filed Nov. 3, 1959  5 Sheets-Sheet 2

INVENTOR.
WILLIAM LEONARD FULTON
BY Ostrolenk, Faber,
Gerb & Soffen
ATTORNEYS

Oct. 8, 1963
W. L. FULTON
3,106,351
ROTARY WINDING MACHINE
Filed Nov. 3, 1959
5 Sheets-Sheet 3
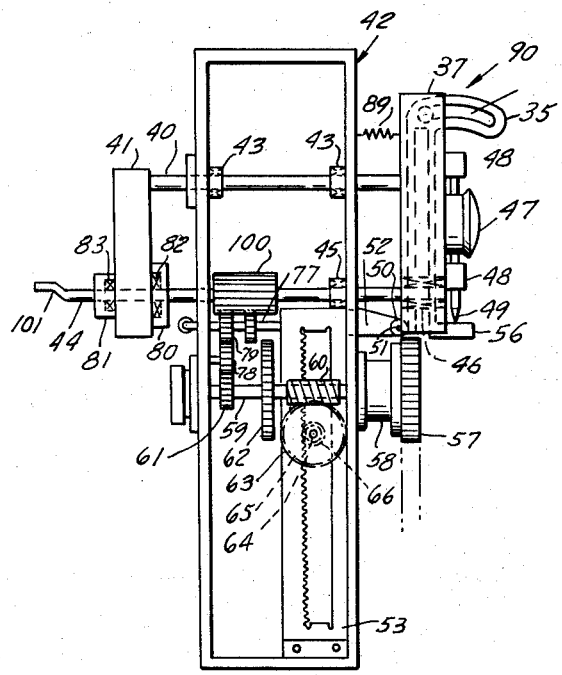
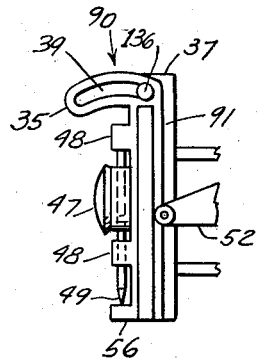
INVENTOR.
WILLIAM LEONARD FULTON
BY
ATTORNEYS Oct. 8, 1963 W. L. FULTON 3,106,351
ROTARY WINDING MACHINE
Filed Nov. 3, 1959 5 Sheets-Sheet 4

INVENTOR.
WILLIAM LEONARD FULTON
BY Ostrolenk, Faber,
Gerb & Soffen
ATTORNEYS

Oct. 8, 1963  W. L. FULTON  3,106,351
ROTARY WINDING MACHINE
Filed Nov. 3, 1959  5 Sheets-Sheet 5
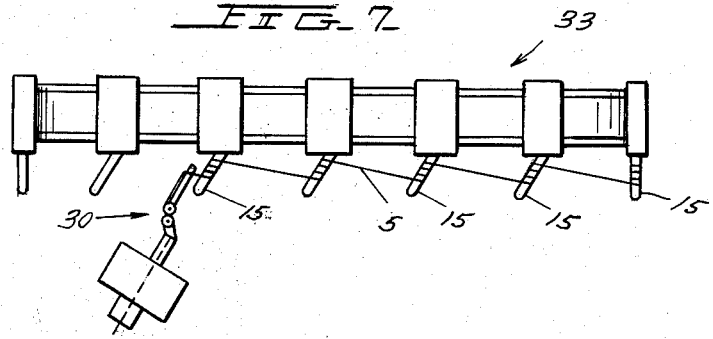
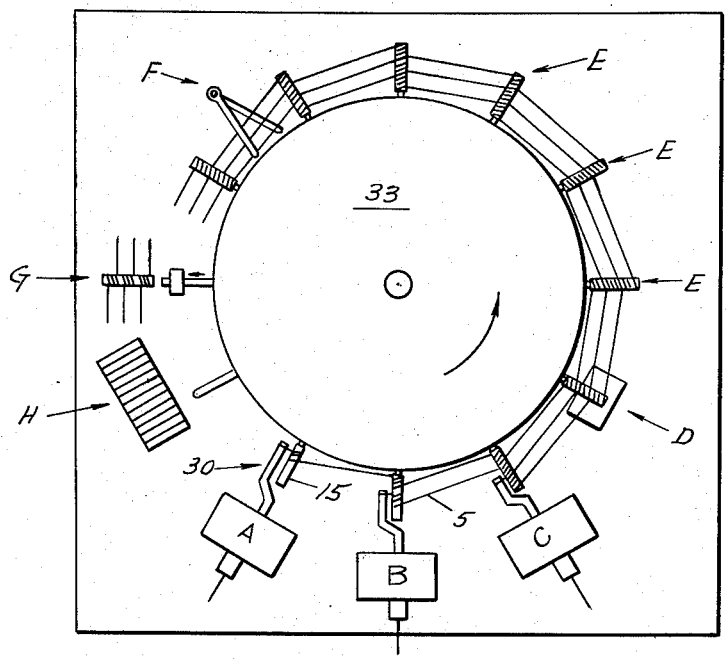
INVENTOR.
WILLIAM LEONARD FULTON
BY
ATTORNEYS

United States Patent Office 3,106,351
Patented Oct. 8, 1963

3,106,351
ROTARY WINDING MACHINE
William Leonard Fulton, Franklin Park, Ill., assignor to Standard Coil Products Co., Inc., Melrose Park, Ill., a corporation of Illinois
Filed Nov. 3, 1959, Ser. No. 850,711
1 Claim. (Cl. 242—9)

My present invention relates generally to a coil winding machine and more particularly to apparatus having a winding head utilizing a sine bar means for automatically winding close tolerance coils.

In winding coils for use in high frequency circuitry, as for example in the case of television tuners, it is extremely important to maintain very close tolerances in the physical dimensions of the coils. It is not uncommon for such television tuner coils to have only three or four turns of wire, in which case even very small errors in the coil diameter, the coil spacing, the pitch of the wire, or the length of the wire may cause relatively large variations in the coil inductance values, thereby necessitating compensating measures. Otherwise, the inductance variation may bring about a highly undesirable lack of sharpness in tuning at a particular frequency. In the production of television tuners, it is common practice to manually adjust the tuner coils to correct for irregularities and lack of uniformity in production. Coils of closer tolerances than are now available may thus help to eliminate or materially reduce this need for manual adjustment.

Also, in very exacting scientific apparatus, such as circuitry for precise determination of the earth's magnetic field at a particular point, the accuracy of the results may very well depend upon, among other factors, the accuracy of the winding of the inductance coils used in the circuit.

It is well known in the art to wind coils manually. The quality of the coils produced in this manner is of course subject to the skill or lack of skill of the operator. Consequently, the quality and uniformity of results of this method could not always be relied upon. In addition, manual means meant a relatively small rate of production of coils per operator, and it has been known for a single company to employ fifty or sixty operators at one time exclusively in turning out various coils, thereby resulting in high labor costs. This procedure is still being used by some coil winding companies.

Other improved machines of the prior art have utilized a source of power in place of manual operation. In order to provide the required wire lead, or space between successive turns, these improved automatic machines in addition to some of the older type manually operated machines have incorporated in their winding heads a cam device which is synchronized with the rotation of the spindle. When it is desired to alter the wire lead, it is necessary to insert a new cam. Manufacturing a cam, especially the type often needed for winding coils with non-uniformly accelerating and decelerating spacings between turns, is a time consuming, highly skilled, and very costly job. Since a new cam is needed for each type of coil, the cost of the cams alone may be a significant part of the cost of the entire machine.

In producing a cam in a tool room, the ordinary procedure is to use a sine bar. Generally, the instant invention applies the sine bar directly to the coil winding machine, thereby completely eliminating the involved and costly procedure of manufacturing the cam. Thus, with this scheme, only one sine bar is required in order to make as many different types of spaced windings as is desirable.

Accordingly, the primary object of my invention is the provision of a novel automatic coil winding machine utilizing a sine bar means for spacing successive turns.

A further object of my invention is the provision of a novel automatic coil winding machine which is less costly to build than similar type machines of the prior art.

A still further object of my invention is the provision of a novel automatic coil winding machine which produces coils of close tolerances and high quality.

The foregoing and other objects of my invention will become apparent in the following description and drawings in which:

FIGURE 1 shows a first embodiment of my novel sine bar operated winding head.

FIGURES 1a and 1b both show possible special purpose shapes that the gap bar of FIGURE 1 may take.

FIGURE 2 is a second embodiment of my novel sine bar operated winding head with the internal gear mechanism eliminated for purposes of simplification.

FIGURE 4 is a view of side 98 of FIGURE 2 with the cover removed showing the internal gear mechanism.

FIGURE 5 illustrates the sine bar of FIGURE 2 in a vertical position.

FIGURE 7 is a top plan view of my novel sine bar operated winding head applied to the arbors on an intermittently moving conveyor chain.

FIGURE 8 is a schematic top plane view of the basic operations carried out on my three head coil winding machine.

Figure 1C:
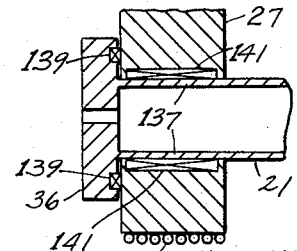
FIGURE 1c is a detail cross-sectional view of the block 27 assembly of FIGURE 1.

Referring first to FIGURE 1 illustrating a first embodiment of my novel sine bar controlled winding head, spindle 21 is caused to rotate by a motor (not shown), and is operatively connected to and synchronized with rack 18 which moves vertically as shown. Rack 18 carries arm 17 upon which pin 16 is secured. Pin 16 is located near one end of and acts as the axis of rotation of sine bar 32, the other end of which has pin 20 secured thereon, pin 20 acting as the axis of rotation for roller 19. Gap bar 22 is secured to wall 24 of winding head 23 and receives movable roller 19 of sine bar 32. Roller 25, which is mounted on pin 26 which in turn is secured to block 27, engages and rides upon sine bar 32. Block 27 is constructed such that it does not rotate with spindle 21, but moves laterally with spindle 21 in response to lateral movement of roller 25. This arrangement may be of the type illustrated in FIGURE 1c wherein end disc 36 is secured to spindle 21 at rim 137 while block 27 rests against disc 36 by means of bearings 139, and also communicates with spindle 21 by means of bearings 141. Block 27 rests on rollers 142, thereby preventing rotary motion of block 27 about spindle 21.

Biasing spring 28 is secured at one end thereof to side 24 of winding head 23 and is secured at the other end thereof to block 27. Wire 5 is fed through spindle 21, transporting pulleys 30 and wire guide 31 to arbor 15 which is mounted upon rotary index table 33. The internal mechanism by which rack 18 is caused to move vertically in synchronization with the rotation of spindle 21 is of the same type as will be disclosed in a second embodiment of my invention to be discussed later in this application.

As spindle 21 rotates, rack 18 moves upward carrying along sine bar 32, which rests upon gap bar 22 through roller 19. As sine bar 32 moves upward, it causes roller 25 to move laterally and away from side 24. Roller 25 in turn acts on spindle 21 through block 27 causing spindle 21 to move laterally in the same direction as roller 25. Spring 28, which is secured to block 27, biases spindle 21 in a direction opposite to that of roller 25 so as to bring about intimate engagement between roller 25 and sine bar 32 and between roller 19 and gap bar 22. The spindle 21 when it moves laterally carries with it wire guide 31, thereby moving wire 5 relative to fixed arbor 15 so as to establish any particular lead or spacing between successive turns.

Sine bar 32 acts in such a manner that it has a camming effect on roller 25. The angle that the sine bar 32 makes with side 24 during any given winding operation determines the resulting camming motion, which in turn determines the coil lead. The gap bar 22 thickness governs the angle which sine bar 32 makes with side 24. Thus, it is readily seen that it is the thickness of gap bar 22 which establishes the lead of the coil.

For example, if gap bar 22 were removed from the machine sine bar 32 would become vertical and no lead would result. By inserting gap bars of varying thicknesses, the angle between sine bar 32 and side 24 can be varied to produce a lead of any dimension within the limits of the device.

Although gap bar 22 is shown as being of rectangular shape, it may of course take on any desirable shape. Thus, if the gap bar 22 were angled as shown in FIGURE 1a, a coil of uniformly accelerated spacing would be produced. That is, the first two turns might be adjacent but the spacing between subsequent turns would increase in dimension uniformly. If gap bar 22 was peaked at the center of its length as shown in FIGURE 1b it would be possible to wind a coil with uniformly accelerated spacing up to point 134 and then uniformly decelerated spacing from point 134 to point 135. Other selected gap bar shapes will of course bring about many varied and desirable coil spacing arrangements.

A second embodiment of my invention is illustrated in FIGURES 2–6. As best shown in FIGURE 2, the design of FIGURE 1 is deviated from by mounting the sine bar assembly rigidly to the spindle. Specifically, sine bar 35 is pinned to casing 37 (FIGURES 2 and 4) at point 38, while casing 37 is fixedly secured to rod 40 (means not shown). The upper part of sine bar 35 contains slot 39 through which bolt 136 passes in order to secure sine bar 35 to casing 37 at a given point of slot 39. Thus, while sine bar 35 is pivotable about pin 38 (FIGURES 2 and 3), it may be secured at any angular position with respect to slide 41 of case 42 by simply fastening bolt 136. Slidable rod 40 is movable through winding head case 42 on bearings 43 (FIGURE 4), while one end of rod 40 is secured to the upper end of block 41. Spindle 44, while resting on bearings 45 is movable together with block 41 by positioning block 41 between collars 80 and 81 (FIGURE 4) which are fastened to spindle 44 and communicate with block 41 through bearings 82 and 83 respectively. Dial indicator 47 is mounted on protrusions 48 of casing 37, the contact tip 49 (FIGURE 5) of which engages right angular section 56 of sine bar 35. Roller 50 is mounted on arm 52 of movable rack 53 by means of pin 51. Bar 91 is secured to sine bar 35 so as to receive roller 50.

Figure 3:
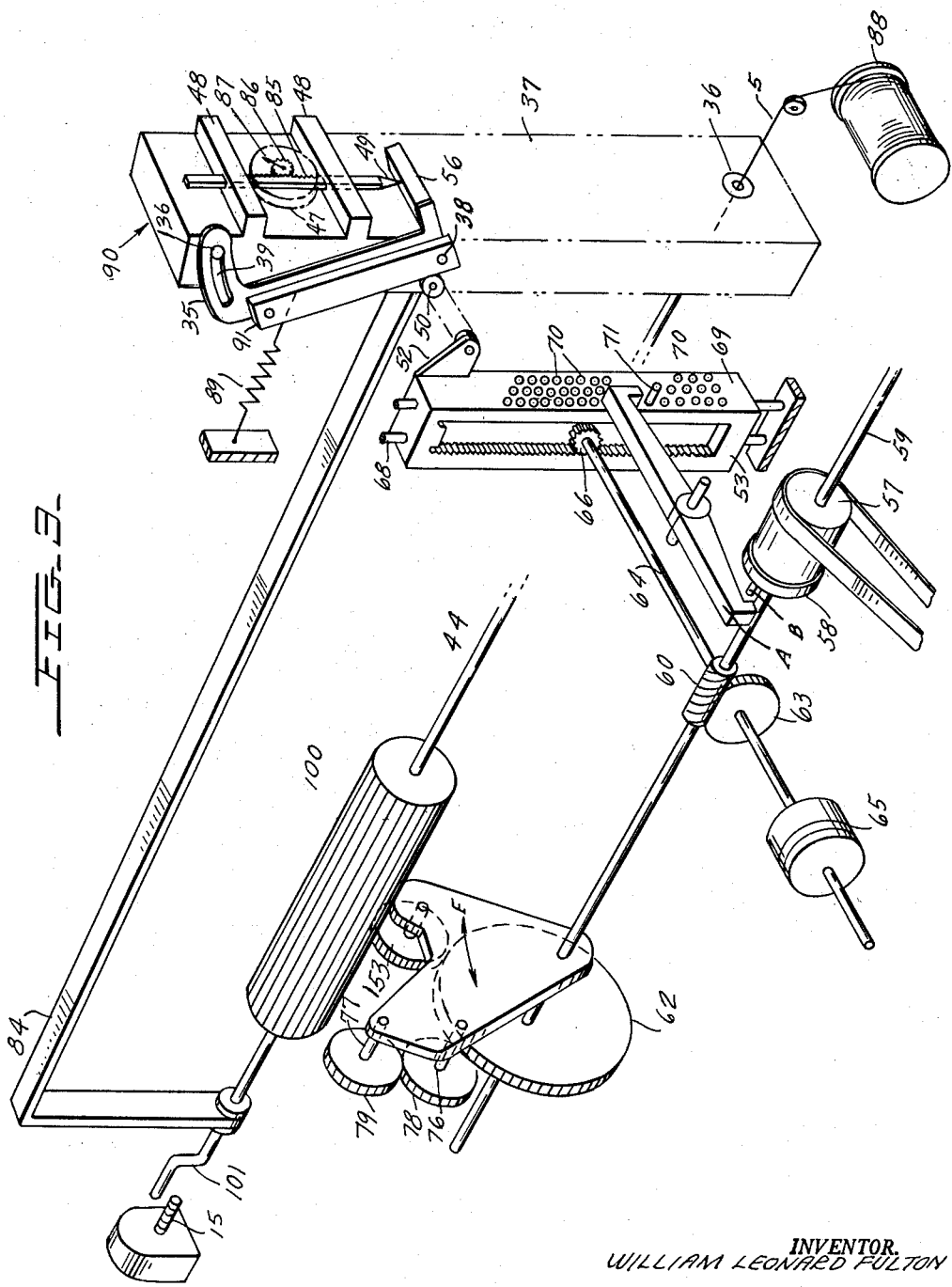
FIGURE 3 is an expanded schematic view of the operating members of my novel winding head.

The operating mechanism of my novel winding head is best seen in FIGURES 3 and 4. The motor (not shown) drives flywheel 57 of single revolution clutch 58 which is mounted on shaft 59. Worm gear 60, on shaft 59, drives spur gear 66 (through spiral gear 63 and shaft 64) which in turn drives rack 53 vertically until latch A disengages the single revolution clutch 58 thereby halting rotation of shaft 59. De-energizing the electric clutch 65 allows the rack 53 to fall thereby positioning itself for a recycle of the mechanism.

Spur gear 63 and electric clutch 65 are joined by shaft 64 in a rigid assembly. Electric clutch plate 65 is joined rigidly to spur gear 66 by shaft 64. When clutch 65 is energized then spur gear 66 can support rack 53; when clutch 65 is de-energized, then the rack 53 may fall because there is no impediment to rotation of gear 66 and shaft 64. Side 69 of rack 53 contains a number of tapped holes 70 spaced in rows a fixed distance apart. In one of these tapped holes a block 71 is inserted, the purpose of which will be explained later. Secured to side 69 of rack 53 is arm 52 upon which is mounted roller 50.

While spur gear 62 (FIGURE 4) may directly engage gear 100, only a uni-directional drive would result. Spur gear 78 is an idler gear used to change direction of shaft 44 from that of the input shaft 59. Gear 62 is engaged with gear 153. Movement of plate F will cause gears 79 or 153 to engage gear 100 to change direction. One end of shaft or spindle 44 passes through casing 37 resting on bearings 46, and carries at its other end, wire guide 101 which rotates about arbor 15. The fixed linkage between block 37 and spindle 44 shown in FIGURE 4 as members 40 and 41 with collars 80 and 81 is diagrammatically indicated in FIGURE 3 as member 84. One possible dial indicator 47 which may be used is shown in FIGURE 3 as having a contact tip 49 comprising the lower portion of dial rack 85 which engages spur gear 86 to which dial pointer 87 is attached. By properly positioning dial pointer 87, any desired angular position of sine bar 35 may be obtained.

It should be noted in FIGURE 3 that for the purpose of clarity sine bar 35 has been shown in front of casing 37, whereas as best seen in FIGURE 4, it is actually positioned behind casing 37.

Spool 88 feeds wire 5 through spindle 44, wire guide 101, and around arbor 15. Spring 89, which is secured at one end to winding head case 42 and at the other end to casing 37, biases sine bar assembly 90 laterally to the left so as to bring about intimate contact between member 91 of sine bar 35 and roller 50. Meanwhile spur gear 66 drives rack 53 upward in response to the action of worm 60 on spiral gear 63. Rack 53 carries arm 52 and roller 50 which through contact with member 91 of sine bar 35 causes the entire sine bar assembly to move laterally to the right, thereby causing spindle 44 and guide 101 to move laterally to the right and maintaining a certain spacing between successive turns of wire 5 being wound on arbor 15. It is obvious that by merely changing the angular position of sine bar 35 as in the vertical sine bar setting of FIGURE 5 for example where a coil of no lead is produced, one can establish any desired coil lead within the limits of the device.

Referring now to FIGURES 2 and 3, as rack 53 is raised by small spur gear 66, the tapped holes 70 rise in synchronization with spindle 44. Block 71 eventually rises to a point where it trips a lever A so that pin B stops rotation of the single revolution clutch and shafts 59 and 44. Flywheel 57 continues to rotate. Rack 53 remains in the upper position until electric clutch 65 is de-energized. De-energization of this clutch disengages spur gear 66 thus allowing rack 53 to return. Under ordinary conditions, some damage would eventually occur due to the rapid return of the rack mechanism. To prevent damage, and also to provide lubrication for the moving parts within the head, it is best to fill the bottom of the winding head with approximately one quart of a medium viscosity lubricating oil.

Figure 6:
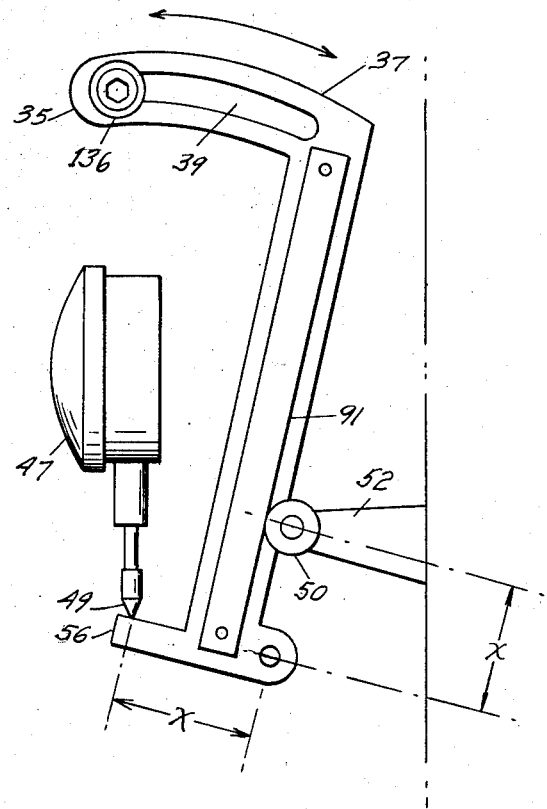
FIGURE 6 illustrates the interaction of the sine bar and the dial indicator.
Figure 6A:
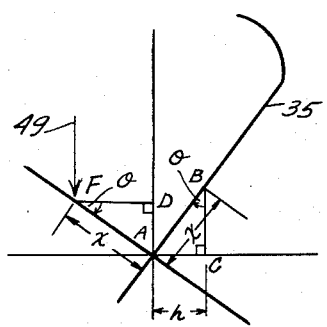
FIGURE 6a is a geometric representation of the angular relationships of FIGURE 6.

Although not shown in the drawings, the winding head is simply mounted on a lath-type cross slide, from which it is possible to position the coil in relation to the coil form to a degree of accuracy of thousandths of an inch. Calibration of the dial indicator may be accomplished in the following manner. Referring to FIGURES 6 and 6a, the control tip 49 of dial indicator 47 is positioned a distance X from pivot 51, this distance X being equal to the distance X along sine bar 35 that roller 50 moves for a given number of turns $n$ of spindle 44. For purposes of illustration, let $n=10$ such that a "decade" dial reading may be obtained. It is readily seen from the geometric simplification of FIGURE 6a that triangle ABC is congruent with triangle ADF where $DA=AC=h$ the change in height of contact tip 49 for $n=10$ turns of spindle 44. The distance $h$ that point A moves from its original position C for $n=10$ turns of spindle 44 is obviously equal to the length of the coil wound. This length L is equal to the number of turns of wire 10 multiplied by the center to center distance between wires $d$. Therefore $h=L=10d$. But the center to center distance between wires $d$ is merely the sum of the width of the wire $w$ and the spacing distance between wires $s$. Thus $d=w+s$ and $h=10(w+s)$. Hence the dial reading is directly proportional to the sum of $w+s$, thereby enabling one to exactly fix the lead or spacing between adjacent turns of wire. If for example with $n=10$, a wire whose diameter is .030" is to be wound, and it is required that no spacing exist between adjacent turns. The sine bar is tipped until the indicator dial reads .300". If a spacing of .001" is desired between adjacent turns, the sine bar is tipped until the indicator reads .310". If a spacing of .005" is desired between turns, the dial setting would be .350" etc. By this arrangement of dial indicator and sine bar assembly, and as noted before by utilizing a lathe type cross slide for mounting the winding head, it is possible to position a turn of wire on a coil within an accuracy of tenths of thousandths of an inch.

In FIGURE 8, a top plan view of a coil winding machine in schematic form is shown illustrating the basic operation of a three headed adaptation of my novel coil winding head. In this machine, head A winds one coil as previously described. The arbor then indexes to head B where a second coil is wound, and then to head C where a third coil may be wound. The arbor is then indexed to station D where acetone is poured on to brushes and capillary action conducts it to the coil. The wire used usually has a covering of Celanese and nylon in approximate equal proportions. The acetone dissolves the Celanese layer of the coil and cements the coils together. They are then dried by the action of hot air at stations E. After drying, the wires between arbors are cut at wire cutting station F, and shortly thereafter the completed coil is ejected at station G. After ejection, the bare arbor indexes to station H where a fresh coil form is inserted prior to winding.

The basic operations of the machine shown in FIGURE 8 are carried over to FIGURE 7 except that the arbors intermittently move on a conveyor chain rather than a rotary table. The conveyor chain scheme has the advantage of enabling a great many arbors to be used, thereby allowing a long drying period and resulting in a better coil wound at a higher speed. In such a machine it is necessary that the wire guide have sufficient clearance while revolving around the arbor such that it will not strike the wire from the previous winding. Although the rotary machine provides sufficient wire guide clearance, prior attempts at conveyor type machines were not successful due to the fact that the arbors were positioned at right angles to the conveyor chain with the result that the winding wire guide struck the wire from the previous coil. In the embodiment of FIGURE 7, however, I have lined up the arbors and the spindle of the winding head and positioned both angularly with respect to the conveyor chain, thereby providing adequate wire guide clearance and allowing use of the conveyor chain method of coil production with its resulting advantages.

Thus in my invention and its various embodiments, I have provided an automatic coil winding machine comprising a winding head utilizing a sine bar means for regulating the spacing between successive turns, thereby eliminating the need for the conventionally used cam means and resulting in significantly lower machine costs. A cam which in the past may have cost a few hundred dollars to manufacture can with my invention be replaced with a gap bar accomplishing the same purpose but at a cost of only twenty or thirty dollars. Considering that for each different coil a new cam is required, the saving is indeed substantial. In addition, I have provided a means of providing very high quality coils of close tolerances both rapidly and efficiently.

Although I have herein described preferred embodiments of my novel invention, many variations and modifications will now be apparent to those skilled in the art, and I therefore prefer to be limited, not by the specific disclosure herein but only by the appending claim.

I claim:

In a coil winding machine, a winding head comprising a rotatable spindle having an axis of rotation; means for rotating the spindle about its axis; a sine bar mounted for translation in a direction parallel to the axis of the spindle; adjustable means for selectively positioning the sine bar at an angle to said axis, other than 90°, to present a surface inclined to said axis; means for moving said sine bar parallel to said axis at a speed proportional to the angular velocity of the rotatable spindle; means connecting said sine bar and said spindle for moving said spindle along its axis in accordance with the translated position of said sine bar; a wire guide on said spindle; said means for moving said sine bar including slidable means engaging said sine bar; means for moving said slidable means in a direction normal to the direction of translation of the sine bar and for moving said sine bar in a direction parallel to the axis of said spindle; indicating means for indicating said angle and means connecting said sine bar to said indicating means for operating the indicating means, said angular position of said sine bar determining the rate of translation of said spindle along its axis.

References Cited in the file of this patent

UNITED STATES PATENTS

| | | |
|---|---|---|
| 966,046 | Noonan | Aug. 2, 1910 |
| 1,799,229 | Hanna | Apr. 7, 1931 |
| 2,445,109 | Ferguson | July 13, 1948 |
| 2,782,809 | Smallridge | Feb. 26, 1957 |
| 2,855,159 | Mallina | Oct. 7, 1958 |
| 2,861,601 | Marzolf | Nov. 25, 1958 |
| 2,884,791 | Enstrom | May 5, 1959 |
| 2,982,488 | Bailey | May 2, 1961 |